United States Patent [19]

Dea

[11] 3,925,206
[45] Dec. 9, 1975

[54] SYSTEM FOR HOME WASTEWATER TREATMENT AND DISPOSAL

[76] Inventor: Stanley J. Dea, 7 Dogwood Lane, Glen Head, N.Y. 11545

[22] Filed: Sept. 26, 1974

[21] Appl. No.: 509,572

[52] U.S. Cl. ............... 210/104; 210/109; 210/139; 210/170; 210/220; 210/290
[51] Int. Cl.² .................... B01D 21/24; C02C 5/04
[58] Field of Search .............................. 61/10–13; 210/2, 15, 16, 17, 97, 138, 152, 170, 199, 220, 532 S, 221, 104, 109, 121, 123, 139, 290

[56] References Cited
UNITED STATES PATENTS

| | | | |
|---|---|---|---|
| 774,988 | 11/1904 | Maurer | 61/13 X |
| 2,360,812 | 10/1944 | Kelly et al. | 210/17 X |
| 2,518,292 | 8/1950 | De Anglis | 61/11 |
| 2,795,542 | 6/1957 | Horne et al. | 210/17 |
| 3,276,698 | 10/1966 | Wood | 210/220 X |
| 3,658,176 | 4/1972 | Reid | 210/532 S |
| 3,662,890 | 5/1972 | Grimshaw | 210/195 |
| 3,681,236 | 8/1972 | Bergles et al. | 210/532 S |
| 3,724,664 | 4/1973 | Lemberger et al. | 210/170 X |

OTHER PUBLICATIONS

W. A. Hardenbergh, *Home Sewage Disposal*, 1924, pp. 182–199.

"Aerobics — It Can Save Your Sewage Problems, Too"; Popular Science, Oct. 1970, pp. 102, 103, 138.

"Aerobics: The Waste System for Your Leisure Home?"; Popular Science, May 1974, pp. 126–128.

*Primary Examiner*—Charles N. Hart
*Assistant Examiner*—Robert H. Spitzer
*Attorney, Agent, or Firm*—Jones, Tullar & Cooper

[57] ABSTRACT

A system for the treatment and disposal of home wastewater suitable for use in areas where conventional systems such as septic systems are inappropriate due to poor soil percolation capabilities is disclosed. A batch process treatment tank in which the waste liquid is subjected to aerobic treatment is combined with an above-ground disposal field in which the treated waste liquid from the aerobic treating tank is dispersed through direct evaporation to the air and where further dispersal is facilitated through the use of evapo-transpiration. The above-ground disposal field is suitable for installation on either flat or sloping terrain and is of a sufficient size to prevent overflow of waste liquids.

7 Claims, 8 Drawing Figures

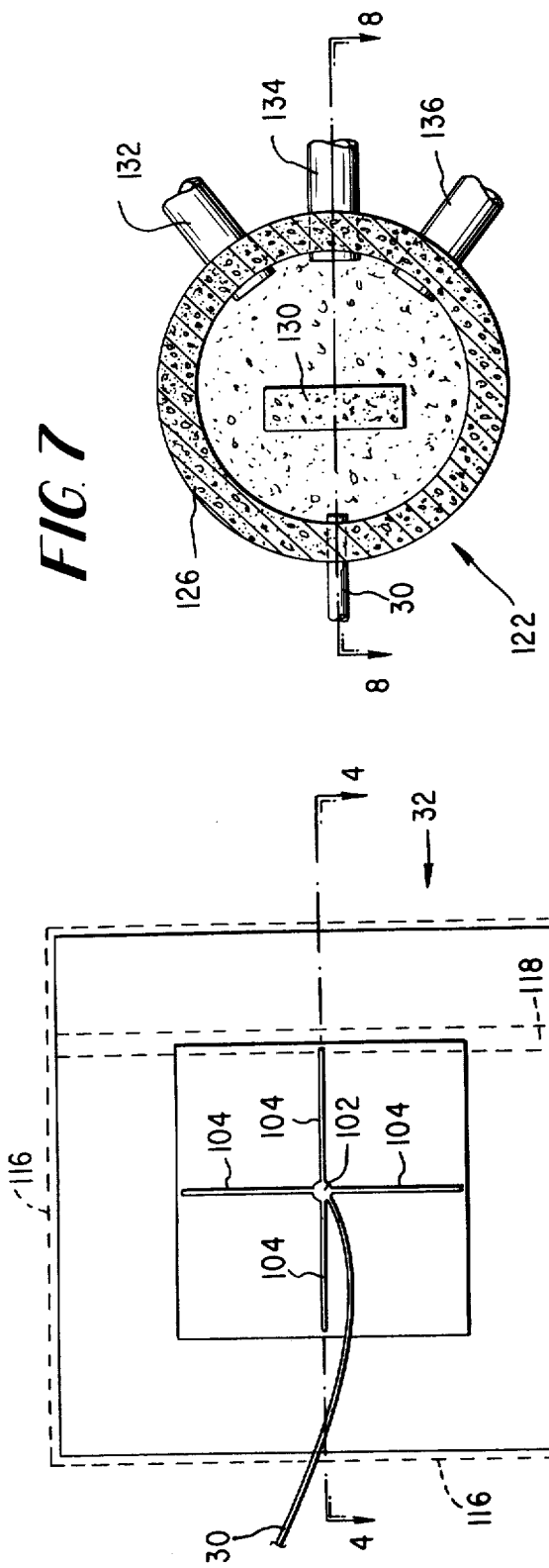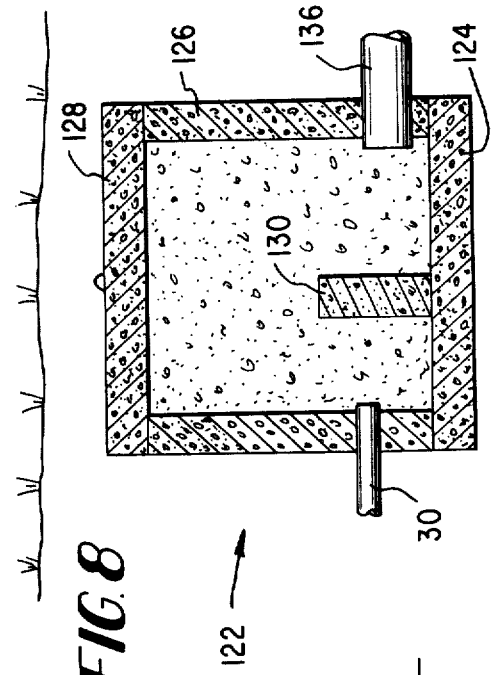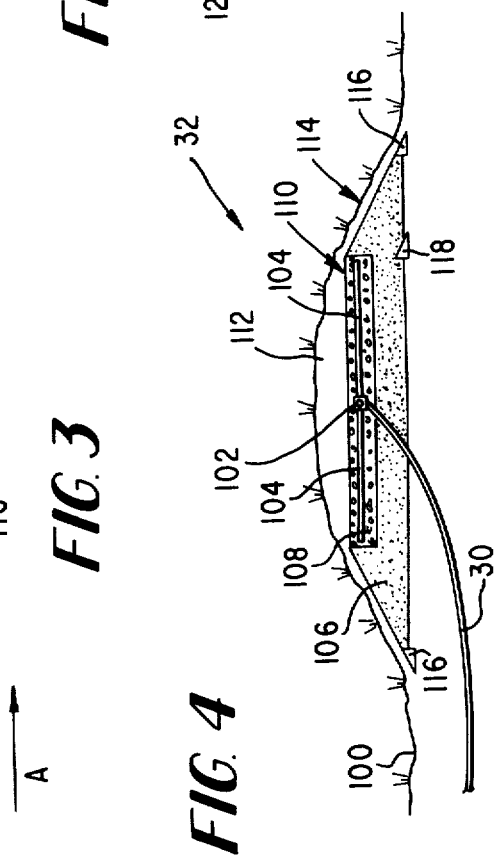

SYSTEM FOR HOME WASTEWATER TREATMENT AND DISPOSAL

FIELD OF THE INVENTION

The present invention is directed generally to a system for home wastewater disposal suited for use in locales where the soil characteristics preclude the use of conventional septic systems. More particularly, the present invention provides an aerobic treatment system wherein residential wastes — i.e. sewage — are subjected to a batch treatment process, and the treated liquid therefrom is then dispersed in an above-ground disposal field which utilizes direct evaporation to the air together with evapotranspiration by use of natural vegetation such as shrubs and trees.

The system of the present invention is ideally suited for use with leisure or second homes, and provides a practical and economic solution to the problem of wastewater disposal when municipal sewer service is unavailable and conventional septic systems are unfeasible due to poor soil percolation capabilities. A treatment tank assembly in which the waste liquid is subjected to aerobic treatment in batch lots is combined with a manmade, above-ground disposal field which takes the place of a conventional septic field or the like. The aerobic treatment process delivers a non-toxic, non-odorous effluent which is readily disposable in the above-ground field and which is sufficiently free of suspended solids to preclude the clogging problems often associated with conventional septic disposal fields.

DESCRIPTION OF THE PRIOR ART

In many areas of the country where no municipal sewage systems for the disposal and treatment of sewage from homes are available, other alternative means of treatment must be utilized. As the number of people buying vacation properties and constructing second or leisure homes increases, the need for individual residential wastewater treatment plants also increases. What was once an acceptable disposal method such as dumping raw wastes into the nearest stream or lake has become clearly unsuitable hence requiring the treatment of household sewage waste in an environmentally acceptable manner.

An early disposal method was the cesspool in which the wastewater was merely transferred to a hole or dry well and allowed to decompose and disperse. This method of treatment was not acceptable due to problems of seepage, clogging, odor, and the like. In view of this, the now conventional septic tank-disposal field system has become widely adopted and used. While the septic system is an improvement over the cesspool, it still has a number of drawbacks which limit its useage.

In a septic system, waste liquids and solids are continually transferred to a sealed holding tank where the solid and liquid wastes are subjected to anaerobic action by microorganisms which break down the wastes. Although these septic tanks are usually provided with various surge tanks, mixing devices, and the like they are constantly subject to hydraulic and/or biological upset since waste liquid flow from private dwellings exhibits a marked diurnal cycle pattern. During the day, two periods of peak load are usually encountered while at night the flow is minimal. The cycle has always been a problem in treatment facility design since, as previously indicated, the system is subject to constantly varying load changes.

The anaerobic action which takes place in a septic tank produces a toxic effluent which is highly odorous, contains a high concentration of dissolved organic matter and has a removal efficiency of only approximately 30% for B.O.D. and suspended solids. Under anaerobic action up to as long as 70 days is required for the complete decomposition of organic solids. Since the septic tank is a continuous process, newly entering waste liquid displaces a similar quantity of treated liquid which is transported by various means to a disposal field, usually a flat piece of land provided with a network of perforated pipes. Since the liquid flowing to the field is high in dissolved and suspended solids, the field is subject to periodic clogging and hence requires either periodic backwashing to unclog it or its complete abandonment and relocation. The toxic, odorous liquid, since it has not been fully treated in the septic tank, undergoes further deterioration in the field, liberating noxious fumes and adversely affecting the surrounding vegetation because of its toxicity. In addition, the septic tank requires the periodic removal and disposal of the sludge formed by the anaerobic treatment of the waste liquids.

If the soil intended for use as the disposal site for the liquid from the septic tank is not sufficiently absorbant — i.e. lacks the required percolation capacity — a further problem is encountered. Since the liquid from the septic tank is still carrying significant amounts of suspended waste solids and hence cannot be disposed of by dumping into a stream or lake or the like, an artificial disposal field must be constructed. However, due to this large amount of solid material carried by the liquid, the field must be quite large and is still subject to the same problem of clogging and the necessity to backwash or abandon as was the natural disposal field. Since, as previously mentioned, as more leisure homes are being build on land lacking available municipal sewer systems or adequate natural disposal capabilities of the soil either in terms of percolation rates not high enough to comply with municipal requirements or where the terrain is not flat enough to allow the liquid to be absorbed before it runs off, it becomes obvious that alternative individual residential wastewater treatment and disposal systems are required.

SUMMARY OF THE INVENTION

It is accordingly an object of the present invention to provide a residential waste treatment and disposal system which overcomes the problems of the prior art.

A further object of the present invention is to provide a waste treatment system utilizing aerobic decomposition of wastes.

Yet another object of the present invention is to provide apparatus for the disposal of waste liquids where the soil lacks sufficient percolation capabilities.

Still another object of the present invention is to provide an artificial disposal field adaptable for use on either flat or naturally sloped terrain.

The present invention utilizes a batch type treatment tank and system wherein the residential wastes are subjected to aerobic decomposition, and further where the treated liquids from the tank are transferred to a manmade, above-ground disposal field suitable for installation on either flat or sloping terrain.

The continuous treatment septic system, as previously mentioned, is troubled by changes in flow rate which cause hydraulic and/or biological upset. In contrast, the present system is a batch treatment system which, instead of attempting to function in spite of the varying flow rate, is intended to utilize and work with it. During the day, the incoming waste liquid is continually aerated to break down the solid particles and to facilitate aerabic action by supplying the liquid with large amounts of oxygen. At night, when the flow is minimal, the agitated liquid is allowed to stand so that treated solids may settle out in the form of sludge, and the treated liquid may be pumped to a suitable disposal field. Suitable timers may control both the aeration and pumping processes to ensure that each function is carried out for the proper length of time.

In aerobic treatment of waste liquids a large amount of oxygen is mixed with the waste liquid. The aeration not only breaks down solid particles, it also encourages the growth of aerobic microorganisms as opposed to the anaerobic ones found in a septic tank. These aerobic organisms are much more efficient than their anaerobic counterparts and cause decomposition of the organic solids in about four hours as opposed to the up to 70 days required by the anaerobic type. The liquid produced by the aerobic action is substantially free of dissolved solids with a removal efficiency of about 90% for B.O.D. and dissolved solids. Additionally, since the treated liquid is high in dissolved oxygen, it is not odorous or toxic as is the effluent from the septic tank.

The high solids removal efficiency of the batch aerobic treatment method is of particular importance in the situation where an artificial disposal field must be provided due to poor soil precolation. While an aerobic system will work very well in conjunction with a natural disposal field, its most advantageous use is with an artificial field. Where the soil does not have sufficient absorptive capacities, it is necessary, as previously discussed, to construct an artificial disposal field. This procedure, which involves the expenditure of a certain amount of time and money, is obviously to be undertaken as infrequently as possible. In the conventional septic system, the eventual clogging of the natural disposal field is planned for, and is usually remedied by abandoning the old field and building a new one. However, when the disposal field must be artificially created, the abandonment of one field and construction of a replacement presents much more of a problem. Since the effluent from an aerobic batch treatment plant is much more free of dissolved solids than is the effluent from a septic tank, the combination of aerobic treatment with an artificial disposal field provides the best solution to the problem of waste liquid disposal.

The disposal field, since it is handling an effluent which is carrying much less dissolved solid matter and is much higher in dissolved oxygen than the effluent from a septic tank, may be of smaller overall area than a septic disposal field. The growth of vegetation adjacent the disposal field is enhanced since the liquid is not toxic and is delivered to the field in batches instead of continuously as in the case of a septic system. This growth of vegetation aids in the dispersal of liquid from the field through the process of evapotranspiration, again reducing the field size requirements. Batch discharge once a day also aids the field and soil in maintaining aerobic conditions by allowing a drying period to occur.

The system of the present invention combines an aerobic batch treatment tank with an artificial, aboveground, disposal field to provide a system for home waste liquids which is efficient, dependable, adaptable to various size requirements, useable in areas of poor soil percolation capacities, not expensive, and which, requires a minimum of maintenance and service.

BRIEF DESCRIPTION OF THE DRAWINGS

While the novel features of the present invention are set forth with particularity in the appended claims, a more full and complete understanding of the invention may be had from the detailed description of a preferred embodiment as set forth hereinafter, and as shown in the accompanying drawings in which:

FIG. 3 is a plan view of a disposal field situated on flat ground;

FIG. 4 is a sectional elevation view of the disposal field of FIG. 3 taken along line 4—4 in FIG. 3;

FIG. 7 is a plan view, partially in cross section, of a distribution box for use in the present invention; and FIG. 8 is a sectional elevation view of the box of FIG. 7 taken along line 8—8 in FIG. 7.

DESCRIPTION OF A PREFERRED EMBODIMENT

Figure 1:
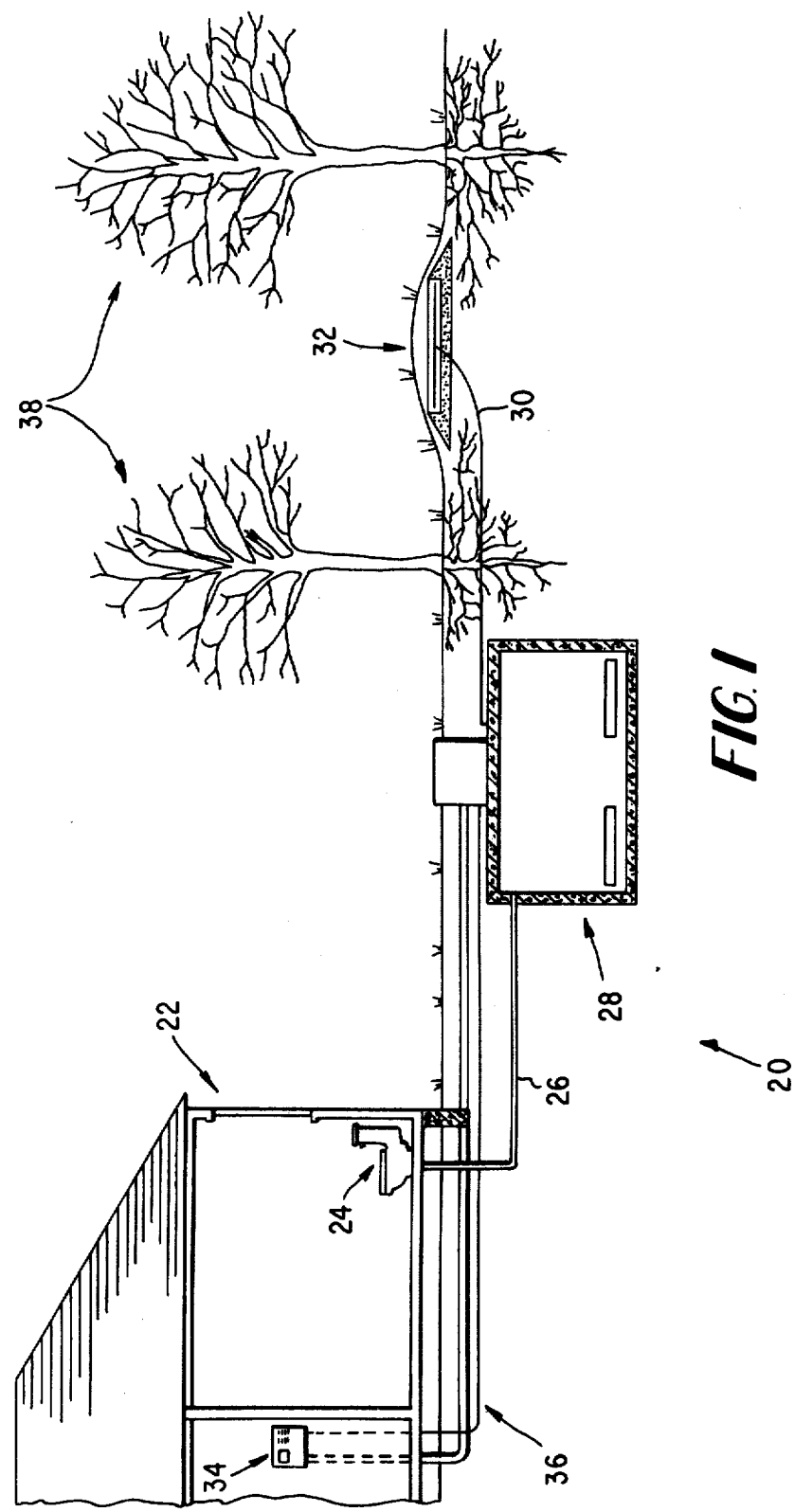
FIG. 1 is an elevation view, partly in section, of the disposal system of the present invention.

Referring now to FIG. 1 there is shown generally at 20 a home waste liquid treatment and disposal system in accordance with the present invention. A home or similar building 22, having various waste liquid generating fixtures such as, for example, a water closet 24, is joined by suitable influent piping 26 to a treatment tank assembly 28. Tank assembly 28, which is provided with various pumps, aerotors, and the like which will be discussed in more detail hereinafter, is joined by suitable effluent piping 30 to an above-ground disposal field, generally at 32. A control panel assembly 34 is located within building 22 and is connected to tank assembly 28 by suitable electric lines 36. Various vegetation, exemplified by trees 38, is located on, and adjacent, disposal field 32 for a purpose as will be discussed more fully hereinafter. While only water closet 24 has been shown in building 22, it will be understood that this is merely exemplary and that various other household plumbing fixtures such as sinks, washbasins, tubs, showers, and the like are also in communication with treatment tank assembly 28 by means of various other pipes 26. The disposal bed 32 also is not actually positioned adjacent tank assembly 28, as shown in FIG. 1, but may be located as dictated by lot size and municipal regulations.

Figure 2:
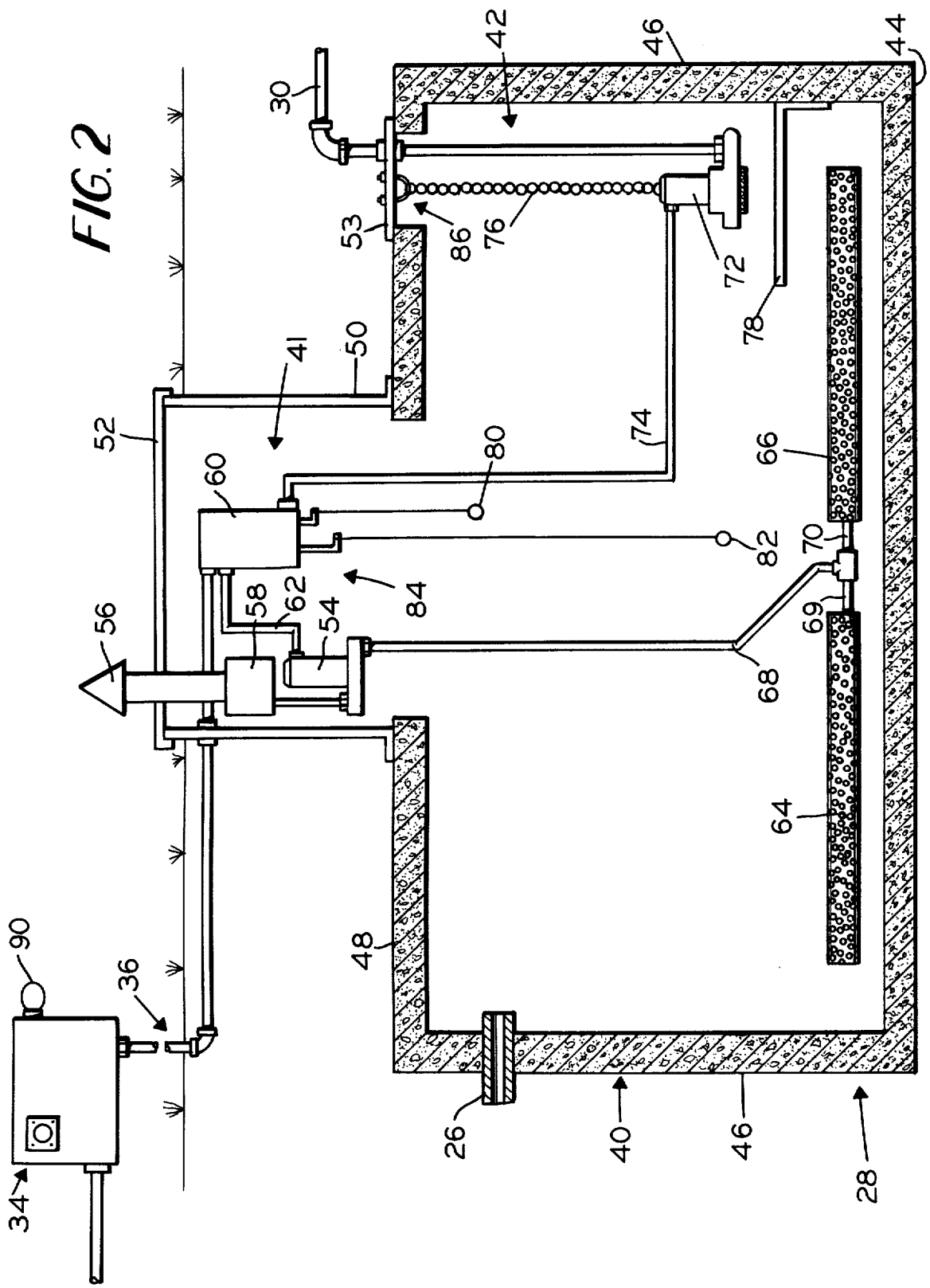
FIG. 2 is an elevation view, partly in section, of the mixing and aerating tank of the present invention.

As may be seen more clearly in FIG. 2, treatment tank assembly 28 is comprised of a tank 40 containing an aerating assembly 41 and a pumping assembly 42. Tank 40 may be of any desired shape such as rectangular, spherical, or the like with, in the preferred embodiment, tank 40 being generally rectangular and having a bottom 44, upstanding walls 46, and a top 48. A manhead 50 is carried on the top 48 of the tank 40 and is provided with a removable cover plate 52 for facilitating access to aerating assembly 41, and a removable cover 53 is provided for allowing access to pumping assembly 42. While, in the preferred embodiment, tank 40 is shown as being buried in the ground with only cover plate 52 protruding thereabove, it will be obvious that the tank 40 could be placed above ground if desired or if dictated by local conditions. Tank 40 may be of any suitable watertight material such as cement, plastic, fiberglass or the like so long as it is capable of maintaining its watertight integrity over a number of years. The volume of the tank will vary in conjunction with the size of the building with which it is to be used in accordance with knowing sanitary engineering criteria with, in the preferred embodiment, the tank capacity ranging from 750 gallons to 1500 gallons for a from 1 to 4 bedroom house.

Aerating apparatus 41 is positioned within manhead 50 and includes a suitable electrically driven blower 54, sealed from the tank atmosphere to prevent deterioration of its drive motor and to eliminate risks of explosion, having an air intake 56 in communication with the ambient air and an air filter 58 for supplying air to blower 54. Electric power to drive blower 54 is provided from a junction box 60, disposed within manhead 50, through suitable conduit and electric wiring 62. Ambient air is taken in through intake 56 and filter 58 and is distributed by blower 54 to at least two diffusers or aerators 64 and 66 disposed adjacent the bottom 44 of tank 40, as may be seen in FIG. 2. Suitable air distribution lines 68, 69 and 70 carry the air from blower 54 to the diffusers 64, 66.

A submersible effluent pump 72 is positioned above the level of the diffusers 64, 66 but nearer the bottom 44 of tank 40. Effluent pump 72 is also provided with electric power from junction box 60 through a suitable electric line 74 and is suspended in place in tank 40 by a chain 76 or similar support secured to cover 53. Effluent piping 30 is connected to pump 72, and liquid taken out of tank 40 by pump 72 is carried to disposal field 32 by effluent piping 30. A baffle 78 is interposed between diffuser or aerator 66 and pump 72 to prevent solids from inadvertently entering the pump 72. A pair of spaced liquid level controllers or float switches 80, 82 are positioned within tank 40, with level controller or float switch 80 disposed in the upper portion of tank 40 and controller or switch 82 in the lower portion of the tank, and are joined to junction box 60 so that the operation of effluent pump 72 may be automatically controlled to insure that the liquid level in the tank 40 remains between the levels of the two level controllers or float switches 80, 82. The top 48 of tank 40 is provided with suitable openings 84 and 86 to facilitate the insertion and removal, if necessary, of the various aerators, effluent pump, and level sensors. Manhead 50 seals opening 84 and opening 86 is sealed by cover 53.

Control panel 34 is, as may be seen in FIG. 1, located within building 22 and is joined to junction box 60 by suitable electric lines 36. Since treatment tank assembly 28 is intended to operate on a batch cycle, control panel 34 is provided with suitable timers and controls (not shown) to provide for operation of, for example, blower 54 and hence aerators 64, 66 for a certain length of time followed by operation of effluent pump 72 for a certain length of time, as will be more fully set forth hereinafter. It will be understood that, in place of the automatic controls provided by panel 34, the actuation of the blower and pump may be done manually. An alarm light 90 is provided in the control circuitry and may be used to indicate the improper functioning of either the blower or pump.

Liquid which has been treated in treatment tank assembly 28, in a manner as will be more fully discussed hereinafter, is pumped by effluent pump 72 through line 30 to disposal field 32, as may be seen generally in FIG. 1. As is shown more specifically in FIGS. 3 and 4, disposal field 32, which is intended for use on ground having a slope of from 0% to 15%, with the slope being in the direction of arrow A in FIG. 3, is of generally rectangular shape and is disposed above ground level 100. Although field 32 is shown as being rectangular, this shape may be varied so long as the total surface area is not reduced. Effluent piping 30 which may be of, for example, 1½ inches PVC is connected by suitable fittings (not shown) to a conventional cast iron sanitary cross 102 which acts as a distribution manifold for the effluent. Four equal length sections of 4 inches diameter, perforated distribution piping 104 having capped outer ends are spaced at 90° to each other and radiate outwardly from cross 102. These sections of piping 104 are all disposed generally horizontally and are all in the same plane.

In the installation of field 32, a trench (not shown) is dug and effluent piping 30 is laid therein. Only the topsoil required to be removed in the digging of this trench is disturbed. A layer of sand fill 106, of a particle size of from 250–500 $\mu$ is then laid to form a generally rectanglar bed having a thickness of at least 2 feet. Above this is placed a layer 108 which is comprised of gravel having particles sizes of from ½ to 2½ inches and a thickness of at least 1 foot. The sanitary cross 102 and distribution piping network 104 are placed on this gravel layer, and the effluent line 30 is connected to the cross 102. Additional gravel 110 is used to cover the distribution piping with a minimum of 4 inches of gravel being placed above the piping 104. A topsoil cover 112, having a minumum thickness of 6 inches, is placed over gravel 110 and the sides of the field are sloped, forming a mound with a slope of 1:2. Grass and similar vegetation is planted on the surface of the mounded field and the existing surrounding vegetation 38, as may be seen in FIG. 1, is disturbed as little as possible. To prevent any runoff of liquid waste should the capacity of the field 32 be exceeded and to retain the sand bed 106 in place, there is provided a surrounding clay dike 116, as may be seen in FIGS. 3 and 4. This dike has a minumum height of 12 inches and extends into the ground to a depth of at least 6 inches. In situations where this disposal field is placed on ground having a slope of from 8–15%, an additional dike 118 is required. This dike is, as may be seen in FIGS. 3 and 4, positioned perpendicular to the direction of ground slope indicated by arrow A in FIG. 3, and directly beneath the downhill end of distribution pipe 104. This additional dike aids in retaining waste liquid should the field capacity be exceeded.

Figure 5:
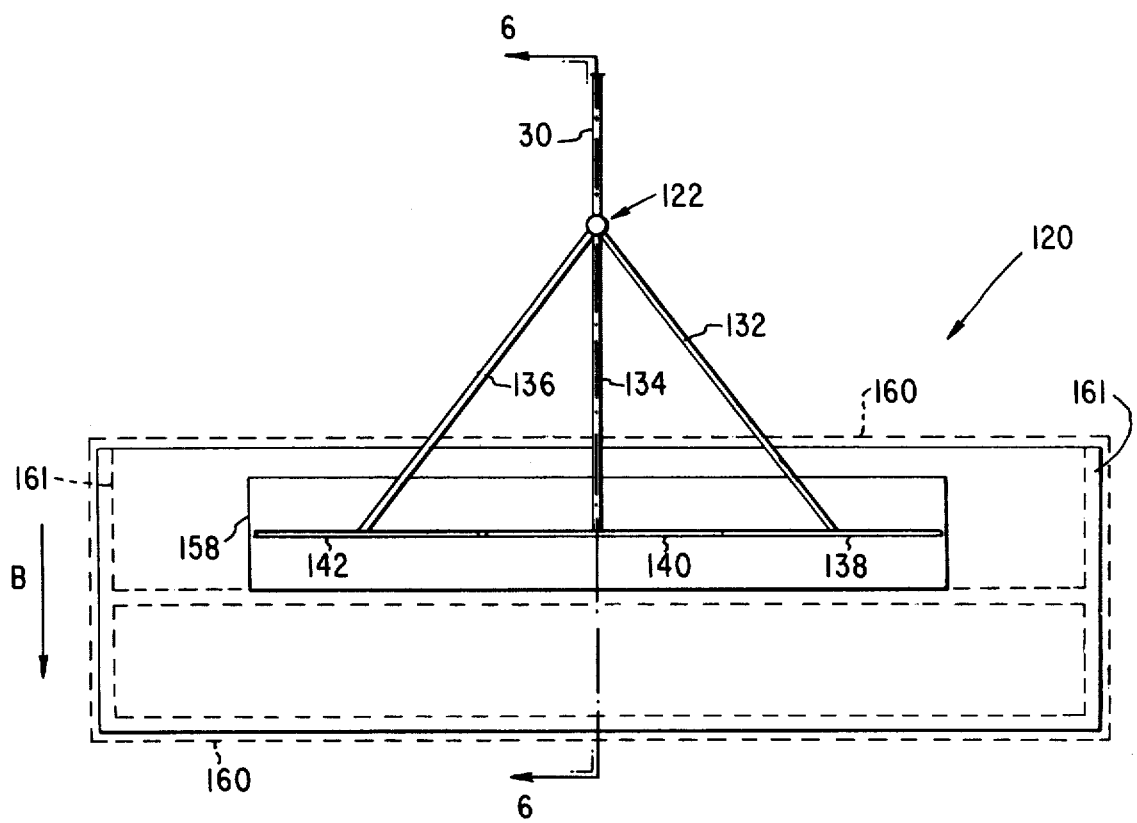
FIG. 5 is a plan view of a disposal field situated on sloped ground.
Figure 6:
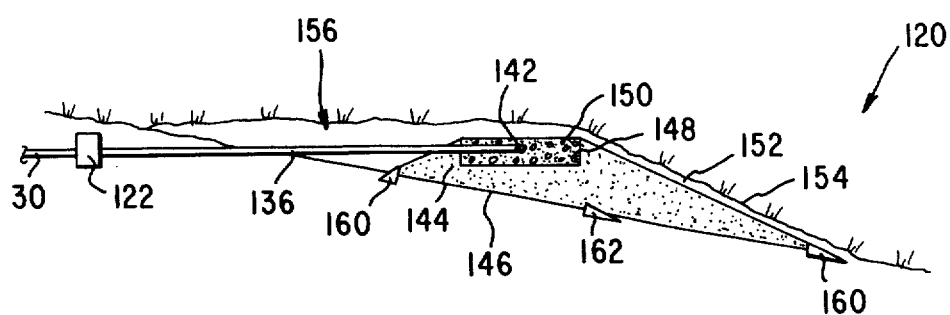
FIG. 6 is a sectional elevation view of the disposal field of FIG. 5 taken along line 6—6 in FIG. 5.

Turning to FIGS. 5 and 6, there will be seen a distribution field 120 similar to the field 32 of FIGS. 3 and 4, but intended for placement on surfaces having a slope of from 16–40%. In this arrangement, effluent piping 30 is fed initially to a distribution box 122 which may be seen most clearly in FIGS. 7 and 8. Distribution box 122 is of generally cylindrical shape and has a base 124, an upstanding cylindrical wall portion 126, and a top 128. A baffle 130 extends upwardly from the base 124 and separates effluent pipe 30 from a plurality of outlet pipes 132, 134 and 136. These outlet pipes are of 4 inch diameter, are not perforated, and slope downwardly in the direction of arrow B in FIG. 5 at a minimum of ¼ inch per foot. The top 128 of distribution box 122 should be disposed at least 1 foot below ground level.

As may be seen in FIG. 5 outlet pipes 132, 134, 136 are joined to three equal length, separate sections of distribution piping 138, 140, 142, respectively. The three sections 138, 140, 142 do not communicate with each other but only with their individual outlet pipes 132, 134, 136, respectively. These distribution pipes are similar to the pipes 104 utilized in field 32 of FIGS. 3 and 4, are of 4 inch diameter, are perforated, but all are capped at both of their respective ends. These pipes 138, 140, 142 are disposed, as may be seen in FIG. 6, in an end-to-end orientation and form, in effect, one elongated distribution pipe disposed parallel to the ground in distribution field 120 which is generally similar to field 32. A layer of sand fill 144 having particles of the same size as fill 106 in field 32 is placed on the topsoil 146. Again, as in field 32, only the topsoil required to be removed to install box 122 and outlet pipes 132, 134, 136 is disturbed. Sand fill layer 144 forms, in this disposal field, a generally oblong shaped bed having a minimum thickness of 2 feet. A gravel bed 148, having particles similar to those of bed 108 in field 32, is placed on sand fill 144 to a depth of at least 1 foot, distribution piping 138, 140, 142 is placed thereon, and additional gravel 150 is added to provide a layer of a minimum thickness of 4 inches above distribution piping 138, 140, 142. As was the case with field 32, a layer of topsoil 152 with a minimum depth of 6 inches is placed over the field and is planted with grass and similar vegetation 154. The slope of the topsoil cover on the downhill side is 1:2 and the uphill side of the bed is provided with a fill layer 156 again, as in field 32, forming a mound.

While the gravel bed in field 32 was shown as having a generally square shape, the gravel bed of field 120 is of a generally oblong shape with the short side 158 of the oblong being at least 8 feet in width and disposed parallel to the direction of the slope of the ground, and perpendicular to the direction of distribution pipes 138, 140, 142, as may be seen in FIG. 5. Clay dikes 160 and 161, disposed perpendicular and parallel to the direction of ground slope indicated by arrow B in FIG. 5 respectively, and of height similar to dike 116 in field 32, surround field 120 to prevent outflow of waste liquids should the capacity of field 120 be exceeded, and to retain sand bed 144 in place. An additional dike 162 is of similar shape as dike 160 and is, as may be seen in FIGS. 5 and 6, disposed perpendicularly to the direction of ground slope indicated by arrow B, and directly beneath the downhill end of gravel bed portion 148 of field 120. Again, as in field 32, any surrounding vegetation such as trees and the like is not interferred with during the installation of field 120.

Since the waste liquid flow will vary depending on the size of the house with which it is associated, the size and hence capacity of the field must also vary. The following table sets forth the various lengths of distribution pipe required, and the various field sizes needed to accomodate the waste liquid effluent from various sized homes. It must be remembered that soil on which the field is constructed is to be viewed as impermeable and hence does not aid in the dispersal of the wastes from the treatment tank.

TABLE I

| Bedrooms in Home | 1 | 2 | 3 | 4 |
|---|---|---|---|---|
| Tank Volume in Gallons Sludge Storage Capacity | 750 | 1000 | 1500 | 1500 |
| in Gallons | 200 | 200 | 300 | 300 |
| Disposal field 32 dimensions 0–15% ground slope | | | | |
| Length of each Dist. Pipe 104 | 6FT | 8FT | 10FT | 12FT |
| Length of dike side 116 | 30FT | 34FT | 38FT | 42FT |
| Disposal field 120 dimensions 16–40% ground slope | | | | |
| Total length of Dist. Pipe 138, 140, 142 | 16FT | 32FT | 48FT | 64FT |
| Length of dike side 160 | 38FT | 54FT | 70FT | 86FT |
| Length of dike side 161 | 20FT | 20FT | 20FT | 20FT |

While the above pipe lengths and field dimensions may be enlarged to provide a larger disposal field which will provide an additional margin of safety should the waste liquid volume be more than anticipated, they should not be reduced since the soil on which the field is placed cannot be expected to contribute to the waste liquid dispersal and therefore all dispersal must be done by the artificially created disposal field.

In operation, waste liquids and solids from the various household facilities 24 will flow by gravity to treatment tank assembly 28, through the various influent lines 26. It is important to reiterate that the operation of the treatment tank assembly is a batch process as opposed to the continuous process carried out in a septic tank system. As previously mentioned, the waste liquid flow from a typical home experiences wide variations, with peak flow in the morning and early evening, and with little or no flow in the late evening and early morning hours. The batch process of the present invention is ideally suited for use with this variation in flow, and conforms to it instead of trying to overcome it as is necessary with a continuous system such as a common septic system. During the day, the waste that flows to tank 40 is continually aerated and kept in circulation by the action of air being forced out through the aerators 64, 66 by blower 54. This circulation forces the bottom sludge to circulate, thus creating a mixture of fresh waste sewage, air bubbles, and bactereological sludge. Aerobic action can begin on the fresh sewage immediately since all the necessary ingredients, oxygen, bacteriological sludge, and fresh sewage, are present. The action of the blower is preferably controlled automatically by a timer circuit carried in control panel 34. The blower and aerator runs approximately 18 to 20 hours of the day with the exact time being determined by tank size, settling time, pumping time, and other related considerations.

By late evening or early morning, the fresh sewage has been completely broken down into small particles and has been subjected to extensive aerobic decomposition. At this time, blower 54 is shut off by its timer circuit, the air bubbles escape from the liquid, and the circulation ceases. Under calm conditions, the solids in the water, which have been processed and transformed, start to flocculate. As the floc grows and increases in weight, it settles out to the bottom leaving a clear supernatant liquid. This settling process will ordinarily be completed in from three to four hours after the shutting off of the blower 54. A second timer circuit, carried in control panel 34, now turns effluent pump 72 on so that the clear liquid may be pumped through effluent line 30 to disposal field 32 or 120. The pump is located at a sufficient height in tank 40 to insure that only clear liquid is removed. Baffle 78 prevents swirling which might cause sludge to be pumped out. Level controllers 80, 82 are provided to insure that the effluent pump does not pump the tank down below a certain level, and to additionally insure that the level in the tank does not rise so high as to be in danger of overflowing the tank. After a preset pumping time of generally ½ to 1 hour, effluent pump 72 is shut off by its timer circuit, and blower 54 is restarted in preparation for the next day's flow of sewage. It will again be understood that, although it is preferred to have the operational times of the blower 54 and effluent pump 72 controlled automatically by the timer circuits carried in control panel 34, that these starting and stopping steps may be carried out by manual actuation of the required switches, if desired. In the case of the use of the treatment system in a vacation home used primarily on weekends, additional conventional timers and controls may be provided to periodically agitate the sludge during the week when the system is inactive and to change to the normal operational cycle set forth hereinabove on weekends or other similar periods of full useage.

The supernatant treated liquid, pumped out of treatment tank 40 by effluent pump 72, passes through effluent piping 30 to the above-ground disposal field 32 or 120, it being understood that the particular field utilized depends on the slope of the ground on which it is installed. The treated liquid, which is low in dissolved solids and high in dissolved oxygen, flows to the bed where it is dispersed through distribution piping 104 or 138, 140, 142 in field 32 or 120, respectively. Since this distribution piping is perforated, the liquid will pass through these perforations and into the gravel and sand making up fields 32 and 120. Here the liquid will either evaporate directly to the air or will be dissipated through evapotranspiration. The root systems of the trees and shrubbery surrounding the disposal field, and the roots of the grass and vegetation on top of the field, act to take up a certain amount of the liquid and to disperse it to the air through evapotranspiration. This combination of direct and indirect disposal of the liquid supplied to the field is sufficient to dispose of all the liquid without dependance on the existing soil on which the bed is placed. Since the field is subjected to periodic flows of liquid followed by periods of no liquid influx, the bed is not continually soaked as in a conventional septic system. This cyclical operation is beneficial to the vegetation since their root systems are not continually soaked. This periodic wetting and drying is also beneficial to further aerobic treatment of any solid waste particles carried to the bed in the liquid from the tank.

Aerobic treatment of residential wastes is known generally in the sewage treatment field and the batch treatment process therefor is also known. Suitable tank and treatment units, which may be utilized in the present system, are commercially available. Such commercially available units, may be employed in the present system, or a tank similar to the one described hereinabove may be fabricated at the job site. Although these tanks and the principle of aerobic sewage treatment are known generally, their useage in combination with an artifically prepared above-ground disposal field to form a system suited for use where the existing soil is impermiable is not known in the art and the resulting system is a significant improvement over prior treatment plants for individual home useage.

While a preferred embodiment of a home sewage treatment system which is economical, efficient, useable in areas where the soil lacks adequate percolation capabilities, easily installed, and unobtrusive has been hereinabove described, it will be obvious to one of ordinary skill in the art that a number of changes in, for example, the materials used in the tank, the specific timer circuitry, the shape of the above-ground disposal bed i.e. rectangular, circular, oval and the like to suit ground contours, may be made without departing from the spirit and scope of the above-described invention and that the invention should therefore be limited only the following claims.

I claim:

1. A system for the aerobic batch treatment of wastewater and for the disposal of said treated wastewater in an above-ground disposal field, said system being suited for use in a locale where the existing soil displays unsuitable percolation capabilities, said system comprising:

a unitary treatment tank assembly for receiving and treating said wastewater, said tank assembly having inlet means for receiving said wastewater from and outlet means including means for transporting said treated wastewater from said tank to said disposal field, said treatment tank assembly further including means for aerating said wastewater to aerobically treat said wastewater while said wastewater is in said tank, said tank assembly further including means for pumping said aerobically treated wastewater through said outlet means out of said tank to said disposal field;

means for sequentially operating said aerating means for a first preselected period of time and said pumping means for a second preselected period of time to provide batch treatment and disposal of said wastewater; and an above-ground disposal field constructed at the surface of ground displaying unsuitable percolation capabilities, said disposal field including a multilayer bed of porous fill material and a network of perforated distribution piping positioned in a first layer of said bed of porous fill, said first layer of fill being disposed above a second layer of porous fill, said first layer having particles of a larger size than particles of said second layer, said first and second layers forming said bed; said above ground disposal field receiving periodically said aerobically treated wastewater from said tank assembly and dispersing and disposing of said wastewater by evaporation and evapotranspiration whereby said wastewater disposal may be completed independently of said soil upon which said disposal field is constructed.

2. The system of claim 1 wherein said bed is mound shaped whereby maximum area for evaporation is provided per square unit of soil covered.

3. The system of claim 1 wherein said network of distribution piping is comprised of a plurality of individual sections of perforated pipe, all said sections of pipe emanating from a central sanitary iron cross and all said sections of pipe being disposed horizontally in the same plane whereby there is provided a disposal field suitable for use on ground having a slope of 0–15%.

4. The system of claim 1 wherein said network of distribution piping is comprised of a plurality of individual sections of perforated pipe, each said section of pipe being joined by a separate outlet pipe to a distribution box, said box located exterior to said disposal field, and further wherein said sections of distribution piping are positioned in an end to end relationship in said bed and are generally parallel to said surface of said existing soil and perpendicular to the direction of slope of said existing soil whereby there is provided a disposal field suitable for use where said slope of said soil is from 16–40%.

5. The system of claim 1 wherein said means for aerating said wastewater includes at least two aerators disposed within said tank and supplied with air by a blower placed in a manhead carried on the top of said tank.

6. The system of claim 5 wherein said means for pumping said aerobically treated wastewater out of said tank includes a submersible effluent pump disposed within said tank.

7. The system of claim 6 wherein said tank assembly includes at least two float switches, said float switches situated at different levels in said tank, said float switches acting to control the operation of said effluent pump whereby the level of wastewater in said tank is maintained between said different levels of said float switches.

* * * * *

UNITED STATES PATENT AND TRADEMARK OFFICE
CERTIFICATE OF CORRECTION

PATENT NO. : 3,925,206
DATED : December 9, 1975
INVENTOR(S) : Stanley J. Dea

It is certified that error appears in the above-identified patent and that said Letters Patent are hereby corrected as shown below:

In Column 10, line 28, after "wastewater" delete "from".

Signed and Sealed this ninth Day of March 1976

[SEAL]

Attest:

RUTH C. MASON
*Attesting Officer*

C. MARSHALL DANN
*Commissioner of Patents and Trademarks*

REEXAMINATION CERTIFICATE (496th)
United States Patent [19]
Dea

[11] B1 3,925,206

[45] Certificate Issued May 6, 1986

[54] SYSTEM FOR HOME WASTEWATER TREATMENT AND DISPOSAL

[76] Inventor: Stanley J. Dea, 7 Dogwood La., Glen Head, N.Y. 11545

Reexamination Request:
No. 90/000,470, Nov. 23, 1983

Reexamination Certificate for:
Patent No.: 3,925,206
Issued: Dec. 9, 1975
Appl. No.: 509,572
Filed: Sep. 26, 1974

[51] Int. Cl.⁴ .................. B01D 21/24; C02C 5/04
[52] U.S. Cl. ............................ 210/104; 210/109; 210/139; 210/170; 210/220; 210/290
[58] Field of Search .......... 210/97, 104, 109, 121, 210/123, 138, 139, 170, 199, 220, 221.1, 532.2, 620, 629, 601, 202, 218, 257.1, 258, 259

[56] References Cited

U.S. PATENT DOCUMENTS

| | | | |
|---|---|---|---|
| 774,988 | 11/1904 | Maurer | 47/79 |
| 2,360,812 | 10/1944 | Kelly et al. | 210/617 X |
| 2,518,292 | 8/1950 | DeAnglis | 405/47 |
| 2,795,542 | 6/1957 | Horne et al. | 210/617 X |
| 3,276,698 | 10/1966 | Wood | 210/220 X |
| 3,658,176 | 4/1972 | Reid | 210/532.2 |
| 3,662,890 | 5/1972 | Grimshaw | 210/195.3 |
| 3,681,236 | 8/1972 | Bergles et al. | 210/532.2 |
| 3,724,664 | 4/1973 | Lemberger et al. | 210/170 X |

OTHER PUBLICATIONS

Waste Water Units for Individual Buildings and Houses, by Dr. Alfred P. Bernhart, Engineering Journal, Jul. 1964, pp. 19-25.
Soil Absorption of Septic Tank Effluent-A Field Study of Some Major Soils in Wisconsin, by J. Bouma et al, Information Circular No. 20, 1972, The Geological and Natural History Survey, Univ. Of Wisc.
Bulletin No. N7221 Flyght Mini-Plant Aerobic Sewage Treatment Plant for Individual Homes, a Bulletin by Flyght Corporation, 129 Glover Avenue, Norwalk, Conn. 06856, copyrighted 1972 by Flight Corporation.
W. A. Hardenbergh, "Home Sewage Disposal", 1924, pp. 182-199.
"Aerobics-It Can Save Your Sewage Problems, Too", Popular Science, Oct. 1970, pp. 102, 103, 138.
"Aerobics: The Waste System for your Leisure Home?", Popular Science, May 1974, pp. 126-128.

*Primary Examiner*—Robert H. Spitzer

[57] ABSTRACT

A system for the treatment and disposal of home wastewater suitable for use in areas where conventional systems such as septic systems are inappropriate due to poor soil percolation capabilities is disclosed. A batch process treatment tank in which the waste liquid is subjected to aerobic treatment is combined with an above-ground disposal field in which the treated waste liquid from the aerobic treating tank is dispersed through direct evaporation to the air and where further dispersal is facilitated through the use of evapotranspiration. The above-ground disposal field is suitable for installation on either flat or sloping terrain and is of a sufficient size to prevent overflow of waste liquids.

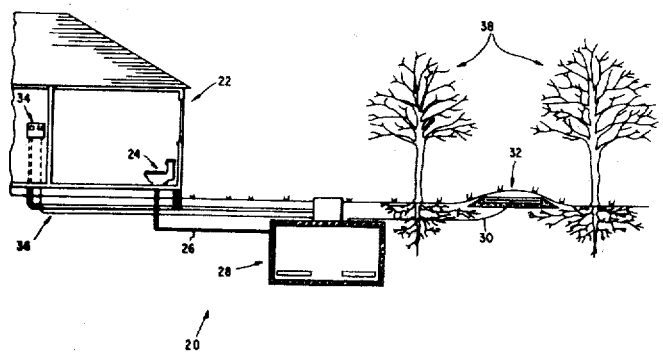

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-7 are cancelled.

* * * * *